US009726022B2

United States Patent
Mittendorf et al.

(10) Patent No.: US 9,726,022 B2
(45) Date of Patent: Aug. 8, 2017

(54) AXIALLY-SPLIT RADIAL TURBINES

(71) Applicant: HONEYWELL INTERNATIONAL INC., Morristown, NJ (US)

(72) Inventors: Don Mittendorf, Mesa, AZ (US); David K. Jan, Fountain Hills, AZ (US); Jason Smoke, Phoenix, AZ (US); Amandine Miner, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 77 days.

(21) Appl. No.: 14/713,220

(22) Filed: May 15, 2015

(65) Prior Publication Data

US 2015/0247409 A1 Sep. 3, 2015

Related U.S. Application Data

(62) Division of application No. 13/444,070, filed on Apr. 11, 2012, now Pat. No. 9,033,670.

(51) Int. Cl.
*F01D 5/04* (2006.01)
*F01D 5/06* (2006.01)
(Continued)

(52) U.S. Cl.
CPC ............ *F01D 5/147* (2013.01); *B23P 15/006* (2013.01); *F01D 5/04* (2013.01); *F01D 5/045* (2013.01);
(Continued)

(58) Field of Classification Search
CPC ............ F01D 5/04; F01D 5/043; F01D 5/045; F01D 5/046; F01D 5/048; F01D 5/063;
(Continued)

(56) References Cited

U.S. PATENT DOCUMENTS 1,959,703 A * 5/1934 Birmann ................. F01D 5/048
415/115
2,439,127 A 4/1948 Dailey, Jr. et al.
(Continued)

FOREIGN PATENT DOCUMENTS

DE 3802763 A1 8/1989
EP 1840385 A2 10/2007
(Continued)

OTHER PUBLICATIONS

USPTO Office Action, Notification Date Nov. 21, 2014; U.S. Appl. No. 13/451,245.
(Continued)

*Primary Examiner* — Gregory Anderson
*Assistant Examiner* — Christopher R Legendre
(74) *Attorney, Agent, or Firm* — Lorenz & Kopf, LLP

(57) ABSTRACT

Embodiments of an axially-split radial turbine, as are embodiments of a method for manufacturing an axially-split radial turbine. In one embodiment, the method includes the steps of joining a forward bladed ring to a forward disk to produce a forward turbine rotor, fabricating an aft turbine rotor, and disposing the forward turbine rotor and the aft turbine rotor in an axially-abutting, rotationally-fixed relationship to produce the axially-split radial turbine.

18 Claims, 10 Drawing Sheets

(51) Int. Cl.
*F01D 5/08* (2006.01)
*F01D 5/14* (2006.01)
*F01D 5/18* (2006.01)
*F01D 5/28* (2006.01)
*F01D 5/30* (2006.01)
*B23P 15/00* (2006.01)

(52) U.S. Cl.
CPC ............. *F01D 5/046* (2013.01); *F01D 5/048* (2013.01); *F01D 5/066* (2013.01); *F01D 5/088* (2013.01); *F01D 5/18* (2013.01); *F01D 5/187* (2013.01); *F01D 5/28* (2013.01); *F01D 5/30* (2013.01); *F05D 2230/60* (2013.01); *Y02T 50/671* (2013.01); *Y02T 50/676* (2013.01); *Y10T 29/49321* (2015.01); *Y10T 29/49323* (2015.01); *Y10T 29/49341* (2015.01)

(58) Field of Classification Search
CPC . F01D 5/066; F01D 5/08; F01D 5/085; F01D 5/088; F01D 5/147; F01D 5/187; F01D 5/28; F01D 5/30; F01D 5/3061; F05D 2240/242; F05D 2240/30; Y10T 29/49321; Y10T 29/49323; Y10T 29/49339; Y10T 29/49341
See application file for complete search history.

(56) References Cited

U.S. PATENT DOCUMENTS

| | | | |
|---|---|---|---|
| 2,579,583 A | 12/1951 | Johnson | |
| 2,625,365 A | 1/1953 | Moore | |
| 2,660,399 A | 11/1953 | Robinson et al. | |
| 2,799,473 A | 7/1957 | Smith et al. | |
| 2,941,780 A | 6/1960 | Von Der Nuell | |
| 3,065,954 A | 11/1962 | Whitaker | |
| 3,167,301 A | 1/1965 | Whitaker | |
| 3,297,301 A | 1/1967 | Petrie et al. | |
| 3,412,978 A * | 11/1968 | Keenan | F01D 5/045 415/226 |
| RE27,038 E * | 1/1971 | Newland | F01D 5/045 416/183 |
| 3,582,232 A | 6/1971 | Okapuu | |
| 3,612,719 A * | 10/1971 | Nomura | F01D 5/025 415/143 |
| 3,628,880 A | 12/1971 | Smuland et al. | |
| 3,642,383 A * | 2/1972 | Andvig | F01D 5/025 416/183 |
| 3,818,696 A | 6/1974 | Beaufrere | |
| 3,958,905 A * | 5/1976 | Wood | F01D 5/045 415/143 |
| 3,999,030 A | 12/1976 | Nakazaki et al. | |
| 4,125,344 A * | 11/1978 | Tiefenbacher | F01D 5/045 416/183 |
| 4,152,816 A * | 5/1979 | Ewing | B22F 7/062 228/104 |
| 4,175,911 A | 11/1979 | Tienfenbacher | |
| 4,183,719 A | 1/1980 | Bozung | |
| 4,186,473 A * | 2/1980 | Cross | B23P 15/006 228/127 |
| 4,273,512 A * | 6/1981 | Weiler | F01D 5/063 29/889.4 |
| 4,335,997 A * | 6/1982 | Ewing | F01D 5/048 416/185 |
| 4,416,581 A | 11/1983 | Geary, Jr. | |
| 4,417,381 A | 11/1983 | Higginbotham | |
| 4,447,188 A | 5/1984 | Davis et al. | |
| 4,529,452 A | 7/1985 | Walker | |
| 4,538,331 A | 9/1985 | Egan et al. | |
| 4,554,789 A | 11/1985 | Napoli et al. | |
| 4,573,315 A | 3/1986 | Stroem | |
| 4,587,700 A | 5/1986 | Curbishley et al. | |
| 4,641,495 A | 2/1987 | Mowill | |
| 4,659,288 A | 4/1987 | Clark et al. | |
| 4,729,715 A | 3/1988 | Wilde | |
| 4,759,688 A | 7/1988 | Wright et al. | |
| 4,787,821 A | 11/1988 | Cruse et al. | |
| 4,822,244 A | 4/1989 | Maier et al. | |
| 4,826,397 A | 5/1989 | Shook et al. | |
| 4,864,706 A * | 9/1989 | Jenkel | B23K 11/002 228/160 |
| 4,923,370 A | 5/1990 | Larson et al. | |
| 5,061,154 A | 10/1991 | Kington | |
| 5,113,583 A | 5/1992 | Jenkel et al. | |
| 5,192,190 A | 3/1993 | Ferleger et al. | |
| 5,280,703 A | 1/1994 | Corrado et al. | |
| 5,318,406 A | 6/1994 | Bardes | |
| 5,497,615 A | 3/1996 | Noe et al. | |
| 5,572,862 A | 11/1996 | Mowill | |
| 5,593,085 A * | 1/1997 | Tohill | B23P 15/006 228/103 |
| 5,735,046 A | 4/1998 | Frasier et al. | |
| 5,832,718 A | 11/1998 | Suttrop | |
| 5,961,287 A | 10/1999 | Cairo | |
| 6,089,821 A | 7/2000 | Maguire et al. | |
| 6,146,091 A | 11/2000 | Watanabe et al. | |
| 6,196,792 B1 | 3/2001 | Lee et al. | |
| 6,325,871 B1 | 12/2001 | Burke et al. | |
| 6,331,217 B1 | 12/2001 | Burke et al. | |
| 6,351,938 B1 | 3/2002 | Kerrebrock | |
| 6,430,917 B1 | 8/2002 | Platts | |
| 6,499,953 B1 * | 12/2002 | Bellerose | F04D 29/285 416/175 |
| 6,666,653 B1 | 12/2003 | Carrier | |
| 6,805,535 B2 | 10/2004 | Tiemann | |
| 6,814,544 B2 | 11/2004 | Tsukamoto et al. | |
| 6,969,240 B2 | 11/2005 | Strangman | |
| 7,044,718 B1 | 5/2006 | Platts | |
| 7,441,331 B2 | 10/2008 | Hudson et al. | |
| 7,458,766 B2 | 12/2008 | Dailey et al. | |
| 7,559,745 B2 * | 7/2009 | Falk | F04D 29/284 416/188 |
| 7,584,538 B2 | 9/2009 | Lee | |
| 7,654,094 B2 | 2/2010 | Yagi et al. | |
| 7,669,326 B2 | 3/2010 | Jeutter et al. | |
| 7,779,541 B2 * | 8/2010 | Ockborn | B23K 1/0008 29/889.21 |
| 7,841,083 B2 | 11/2010 | Alaux et al. | |
| 8,015,705 B2 | 9/2011 | Wilson, Jr. et al. | |
| 8,061,989 B1 | 11/2011 | Liang | |
| 8,087,249 B2 | 1/2012 | Ottaviano et al. | |
| 8,206,117 B2 | 6/2012 | Strangman et al. | |
| 8,408,446 B1 | 4/2013 | Smoke et al. | |
| 8,920,128 B2 | 12/2014 | Matwey et al. | |
| 9,033,670 B2 * | 5/2015 | Mittendorf | F01D 5/04 29/889.21 |
| 9,115,586 B2 * | 8/2015 | Jan | F01D 5/026 |
| 9,476,305 B2 * | 10/2016 | Jan | F01D 5/081 |
| 2005/0000091 A1 | 1/2005 | Ockborn et al. | |
| 2008/0068016 A1 | 3/2008 | Gaddipati et al. | |
| 2008/0107531 A1 | 5/2008 | Chou et al. | |
| 2008/0107532 A1 | 5/2008 | Carrier et al. | |
| 2008/0107533 A1 | 5/2008 | Carrier et al. | |
| 2009/0056125 A1 * | 3/2009 | Howe | F04D 27/0246 29/889 |
| 2009/0119919 A1 | 5/2009 | Kington et al. | |
| 2009/0162205 A1 | 6/2009 | Strangman et al. | |
| 2010/0124483 A1 | 5/2010 | Weaver et al. | |
| 2010/0150725 A1 | 6/2010 | Krautheim | |
| 2010/0158668 A1 | 6/2010 | Ottaviano et al. | |
| 2010/0215508 A1 * | 8/2010 | Hagshenas | F04D 29/285 416/90 R |
| 2010/0284817 A1 | 11/2010 | Bamberg et al. | |
| 2011/0219616 A1 | 9/2011 | Bayer et al. | |
| 2012/0090175 A1 | 4/2012 | Schmidt | |
| 2013/0098061 A1 | 4/2013 | Matwey et al. | |

FOREIGN PATENT DOCUMENTS

| | | | |
|---|---|---|---|
| EP | 2653652 A2 | 10/2013 | |
| FR | 1022176 A * | 3/1953 | F01D 5/045 |
| GB | 755841 | 8/1956 | |

(56) References Cited

FOREIGN PATENT DOCUMENTS

| GB | 929960 | 6/1963 |
|---|---|---|
| GB | 2028180 A | 3/1980 |
| GB | 2354043 A | 3/2001 |
| JP | 2004232622 A | 8/2004 |
| WO | 03043779 A1 | 5/2003 |

OTHER PUBLICATIONS

Hammer A.N., Algret G. G., Psichogios T. P., Rodgers C.; Fabrication of Cooled Radial Turbine Rotor—Final Report (Solar Turbines International), NASA-CR-179503; Jun. 1986.
Snyder, P.H.; Cooled High-Temperature Radial Turbine Program, NASA National Aeronautics and Space Administration, NASA CR 189122 USAAVSCOM TR-92-C-010 Report No. EDR 15982; AD-A254827, May 1992.
USPTO, Non-final Office Action issued in U.S. Appl. No. 13/371,922, dated Nov. 19, 2012.
USPTO Notice of Allowance for U.S. Appl. No. 13/371,922 dated Dec. 13, 2012.
USPTO Supplemental Notice of Allowability for U.S. Appl. No. 13/371,922 dated Jan. 2, 2013.
EP examination report for Application No. 14166274.2-1610 dated Mar. 12, 2015.
USPTO Notice of Allowance for U.S. Appl. No. 13/892,828 dated Mar. 15, 2016.
Hammer, A.N. et al.; Fabrication of Cooled Radial Turbine Rotor; Final Report NASA CR-179503 Solar Turbines Incorporation, Jun. 1986.
EP Search Report for Application No. 14166274.2-1610/2803820 dated Dec. 18, 2014.
EP Exam Report for Application No. 14166274.2-1610 dated Jan. 22, 2015.
USPTO Office Action, Notification Date Feb. 9, 2016; U.S. Appl. No. 13/892,828.
EP Search Report for Application No. EP 13153710.2 Dated Feb. 10, 2016.
EP Examination Report for Application No. EP 13153710.2 Dated Feb. 19, 2016.

\* cited by examiner

AXIALLY-SPLIT RADIAL TURBINES

CROSS-REFERENCE TO RELATED APPLICATION

This application a divisional of co-pending U.S. application Ser. No. 13/444,070, filed Apr. 11, 2012.

TECHNICAL FIELD

The present invention relates generally to gas turbine engines and, more particularly, to axially-split radial turbines for usage within gas turbine engines, as well as to methods for fabricating axially-split radial turbines.

BACKGROUND

Gas turbine engines ("GTE") have been engineered extensively to improve efficiency, thrust-to-weight ratios, and other measures of engine performance. One of the most direct manners by which engine performance can be improved is through increases in core rotational speeds and turbine inlet temperatures generated during engine operation. However, as turbine inlet temperatures and rotational speeds increase, so too do the thermal and mechanical demands placed on the GTE components. The most demanding performance requirements are typically placed on the high pressure turbine rotor or rotors, which are positioned immediately downstream of the GTE combustion section and which rotate at the greatest speed during engine operation. The turbine blades, in particular, are directly exposed to combustive gas flow at or near peak temperatures and are consequently heated to exceedingly high temperatures at which most alloys weaken or melt and become prone to oxidation or other forms of chemical degradation. By comparison, the inner annular body of the turbine (commonly referred to as the "turbine disk") is largely shielded from direct exposure to combustive gas flow, but is subject to considerable mechanical stress resulting from both centrifugal forces acting on the turbine rotor at high rotational speeds and rim-to-bore thermal gradients.

Turbines can be broadly divided into two categories, axial and radial turbines, based upon the direction of airflow received by the turbine relative to the turbine's rotational axis. Compared to axial turbines, radial turbines offer certain performance benefits including superior pressure ratios; e.g., a single radial turbine is often capable of providing a power output equivalent to two similarly-sized axial turbines. Radial turbines also provide relatively smooth exit flow conditions as compared to axial turbine turbines, which are often characterized by highly turbulent outflow. However, by inherent design, radial turbines tend to be relatively lengthy in an axial direction and, thus, have lower power-to-weight ratios. In addition, it is difficult to fabricate radial turbines having internal cooling features, such as cooling flow passages formed within the turbine blades. Specifically, casting of radial wheels with internally-cooled blades has proven excessively costly due to low yields results from the usage of complex casting cores generally required to form the blade cooling passages. An uncooled radial turbine may be incapable of withstanding prolonged stresses at high operational speeds without premature fatigue in situations wherein a gas turbine engine is operated at relatively high combustive gas flow temperatures to boost power output. In such situations, the inability to manufacture an internally-cooled radial turbine in a reliable and cost-effective manner may prevent the usage of a radial turbine altogether and a number of cooled axial turbines may be employed instead. For at least these reasons, radial turbines tend to be utilized only within a relatively limited number of small, low-flow gas turbine engine platforms.

It is thus desirable to provide embodiments of a radial turbine suitable for usage in a gas turbine engine that is relatively lightweight and cost effective to implement. Ideally, embodiments of such a radial turbine would include internal cooling passages to permit operation of the radial turbine at higher temperatures. It would also be desirable if, in certain embodiments, the different sections of such a radial turbine were fabricated from disparate alloys tailored to the particular operating conditions experienced by each turbine section. Finally, it would be desirable to provide embodiments of a method for fabricating such a radial turbine. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a method for producing an axially-split radial turbine are provided. In one embodiment, the method includes the steps of joining a forward bladed ring to a forward disk to produce a forward turbine rotor, fabricating an aft turbine rotor, and disposing the forward turbine rotor and the aft turbine rotor in an axially-abutting, rotationally-fixed relationship to produce the axially-split radial turbine.

Embodiments of an axially-split radial turbine are further provided. In one embodiment, the axially-split radial turbine includes a forward turbine rotor and an aft turbine rotor, which is disposed axially adjacent to and rotationally fixed relative to the forward turbine rotor. The forward rotor includes a forward disk and a forward bladed ring, which circumscribes and is metallurgically bonded to the forward disk.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following detailed description.

Figure 1:
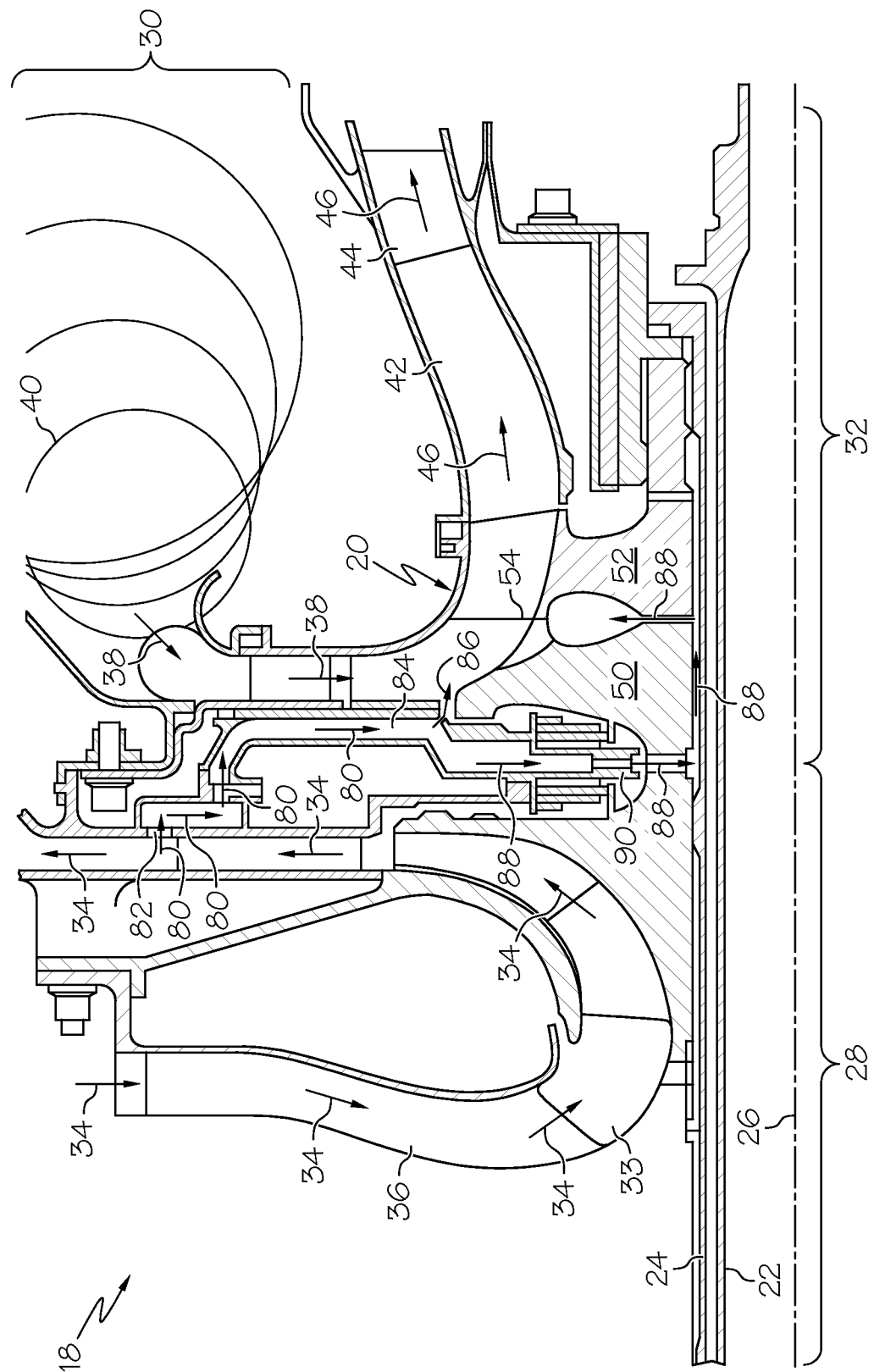
FIG. 1 is a simplified schematic of an exemplary gas turbine engine (partially shown) including an internally-cooled, axially-split radial turbine, as illustrated in accordance with an exemplary embodiment of the present invention.

FIG. 1 is a simplified cross-sectional view of a portion of a gas turbine engine (GTE) 18 including an internally-cooled, axially-split radial turbine 20, as illustrated in accordance with an exemplary embodiment of the present invention. The term "axially-split radial turbine," as appearing herein, is utilized in a broad sense to denote a radial turbine that includes or that is fabricated from at least two axially-mating or axially-abutting structures or sections. As illustrated in FIG. 1 and described herein, GTE 18 is offered by way of example only to provide a convenient and non-limiting context in which an exemplary embodiment of radial turbine 20 can be readily understood. It will be readily appreciated that embodiments of axially-split radial turbine 20 can be employed within various different types of gas turbine engine including, but not limited to, other types of turbofan, turboprop, turboshaft, and turbojet engines, whether deployed onboard an aircraft, watercraft, or ground vehicle (e.g., a tank), included within an auxiliary power unit, included within industrial power generators, or utilized within another platform or application.

In the exemplary embodiment shown in FIG. 1, GTE 18 is illustrated as a two spool engine including a low pressure (LP) shaft 22 and high pressure (HP) shaft 24. LP shaft 22 and HP shaft 24 are co-axial; that is, LP shaft 22 extends through a longitudinal channel provided through HP shaft 24 along the engine centerline and the rotational axis of LP shaft 22, HP shaft 24, and radial turbine 20 (represented in FIG. 1 by dashed line 26). GTE 18 further includes a compressor section 28, a combustion section 30, and a turbine section 32, each of which is only partially shown in FIG. 1. An HP compressor 33 is included within compressor section 28 and mounted to the upstream or forward end of HP shaft 24. Axially-split radial turbine 20 is contained within turbine section 32 and mounted to the opposing, aft end of HP shaft 24. Although not shown in FIG. 1 for clarity, compressor section 28 and turbine section 32 may further include an LP compressor and an LP turbine, respectively, which may be mounted to opposing ends of LP shaft 22. Alternatively, in embodiments wherein GTE 18 is a turbofan-type engine, an intake fan may be mounted to the upstream end of LP shaft 22.

During engine operation, airflow is supplied to compressor section 28 by an intake section included within GTE 18 (not shown). A serpentine compressor section duct 36 guides the pressurized airflow through HP compressor 33, which rotates to further compress the airflow prior to discharge into combustion section 30 (represented in FIG. 1 by arrows 34). Within combustion section 30, the compressed airflow is mixed with fuel and ignited to produce combustive gasses. As indicated in FIG. 1 by arrows 38, the combustive gasses expand rapidly, exit combustion section 30 through a turbine scroll 40, and are directed through HP turbine 20. The combustive gas flow drives rotation of HP turbine 20, which drives further rotation of HP shaft 24 and HP compressor 33. After flowing through HP turbine 20, the combustive gases flow through a turbine section duct 42 and into a turbine nozzle ring 44 (indicated by arrows 46). Turbine nozzle ring 44 accelerates the combustive gas flow and imparts the gas flow with a desired tangential component prior to reaching an LP turbine (not shown), which is positioned downstream of nozzle ring 44 and mounted to the aft end of LP shaft 22. The combustive gas flow drives the rotation of the non-illustrated LP turbine, which drives further rotation of LP shaft 22. The rotation of shafts 22 and 24 provides power output, which may be utilized in a variety of different manners depending upon whether GTE 18 assumes the form of a turbofan, turboprop, turboshaft, turbojet engine, or an auxiliary power unit, to list but a few examples. The combustive gas flow is then mixed with cooler bypass flow and exhausted from GTE 18; e.g., in the case of turbofan or turbojet engine, the combustive gas flow may be exhausted through a propulsion nozzle to provide forward thrust.

Advantageously, internally-cooled, axially-split radial turbine 20 increases the overall efficiency of GTE 18 by allowing increased combustion temperatures and higher efficiency cycles. The improved thermal and mechanical capabilities of radial turbine 20 are achieved, at least in part, by fabricating the turbine blades to include internal cooling flow passages (hidden from view in FIG. 1). As noted in the foregoing section entitled "BACKGROUND," casting of radial wheels with cooled blades has traditionally been undesirably costly due to excessively low yields as a result of complex casting cores required for the blade cooling passages. To overcome this limitation, the following describes exemplary embodiments of a method for fabricating an internally-cooled radial turbine, such as radial turbine 20, wherein a plurality of individual bladed pieces are first cast and subsequently metallurgically consolidated into a monolithic bladed ring, which is then bonded onto a forward disk to yield a forward turbine rotor. A similar process may then be carried-out to produce an aft turbine rotor, which is then placed in an axially-abutting relationship with the forward turbine rotor to produce the radial turbine. In addition, such a process allows the bladed pieces (and thus the forward and/or aft sections of the turbine blades) to be cast from single crystal superalloy materials having optimal resistances to oxidation and other forms of chemical degradation and good mechanical strength at high temperature operating conditions, while other portions of the radial turbine (e.g., the forward and aft disks) are fabricated from non-single crystal alloys having relatively high stress rupture and low cycle fatigue properties. An exemplary embodiment of the axially-split radial turbine fabrication method is described below in conjunction with FIGS. 4-15; first, however, the structure of radial turbine 20, in an illustrative, but non-limiting implementation, is described in detail below in conjunction with FIGS. 2 and 3.

Figure 2:
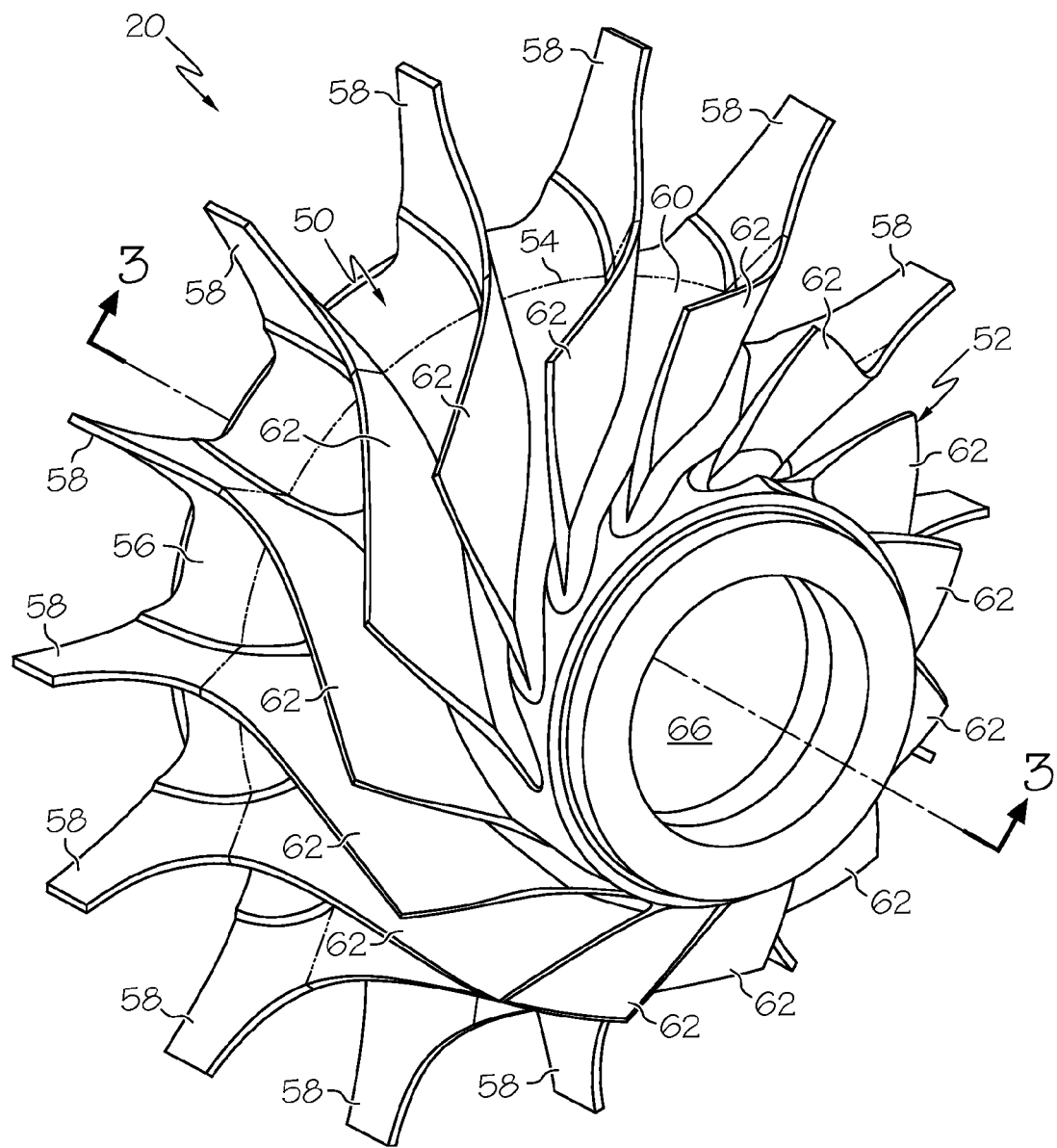
FIG. 2 is an isometric view of the axially-split radial turbine shown in FIG. 1.

FIG. 2 is an isometric view of internally-cooled, axially-split radial turbine 20 employed with GTE 18 (FIG. 1). Referring collectively to FIGS. 1 and 2, axially-split radial turbine 20 is comprised of at least two discrete parts, which are matingly assembled to yield the completed turbine. In the illustrated example, specifically, axially-split radial turbine 20 is comprised of two mating halves, namely, a forward turbine rotor 50 and an aft turbine rotor 52. When radial turbine 20 is assembled, the aft face of forward turbine rotor 50 and the forward face of aft turbine rotor 52 abut along an annular interface, which resides within a plane generally orthogonal to rotational axis 26 and which is referred to herein as "split line 54." Forward turbine rotor 50 and aft turbine rotor 52 can be metallurgically bonded utilizing, for example, a soldering, brazing, or diffusion bonding technique. It is preferred, however, that forward turbine rotor 50 and aft turbine rotor 52 are discrete, non-bonded parts, which are maintained in intimate contact or engagement utilizing a mechanical means, such as a plurality of fasteners or an axial clamping device. For example, as shown in FIG. 1, a curvic may exert an axial clamping preload through forward turbine rotor 50 and aft turbine rotor 52 maintaining rotors 50 and 52 in an abutting, rotationally-fixed engagement.

Figure 3:
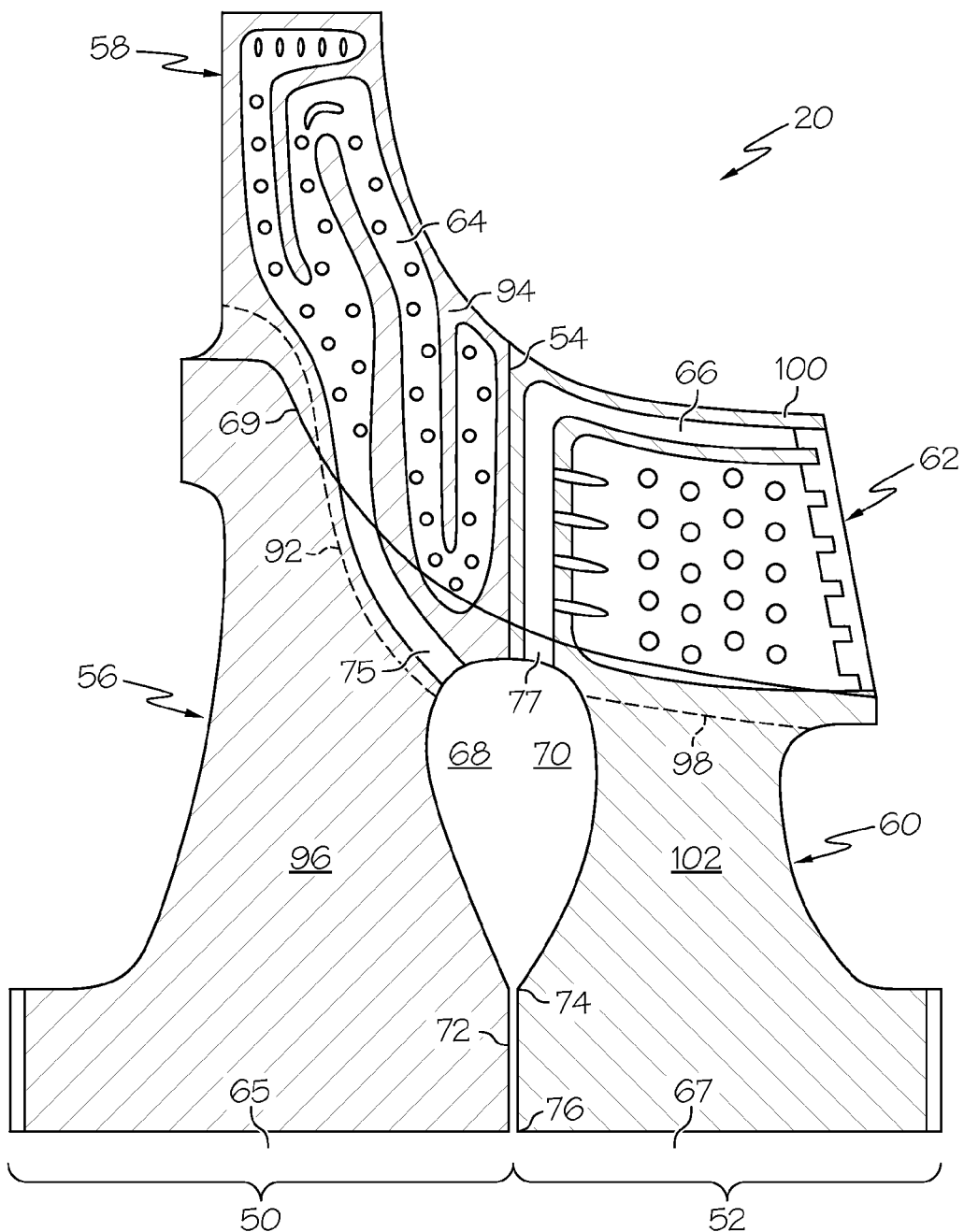
FIG. 3 is a cross-sectional view of a portion of the axially-split radial turbine shown in FIGS. 1 and 2, as taken along line 3-3 identified in FIG. 2, and depicting the fore and aft blade segments in a flattened, cutaway view to more clearly illustrate exemplary internal cooling features, which can be formed within the blade segments.

FIG. 3 is a cross-sectional view of a portion of radial turbine 20, as taken along line 3-3 in FIG. 2. As can be seen in FIGS. 2 and 3, forward turbine rotor 50 includes a forward hub section 56 and a plurality of forward blade segments 58, which are circumferentially spaced around and extend radially outward from hub section 56. Aft turbine rotor 52 likewise includes an aft hub section 60 and a plurality of aft blade segments 62, which are circumferentially spaced around and extend radially outward from hub section 60. As shown most clearly in FIG. 2, forward blade segments 58 and aft blade segments 62 wrap or twist tangentially about the rotational axis of radial turbine 20 in a direction substantially opposite the direction of rotation. However, forward blade segments 58 and aft blade segments 62 are depicted in a flattened-out, cutaway view in FIG. 3 to more clearly illustrate various internal cooling features 64, 66 that can be formed in forward blade segments 58 and/or aft blade segments 62 pursuant to the below-described fabrication process. Internal cooling features 64, 66 may include any number and combination of internal cooling channels, slots, apertures, and the like suitable for cooling blade segments 58 and 62 and neighboring regions of radial turbine 20 during high temperature operation; e.g., as indicated in FIG. 3, the internal cooling features 64, 66 may include blade cooling passages 64 formed in forward blade segments 58 (only one of which is shown in FIG. 3) and/or blade cooling passages 66 formed in aft blade segments 62 (again, only one of which is shown).

Forward hub section 56 aligns axially with aft hub section 60 and, preferably, radially pilots thereto. Although not illustrated in FIGS. 2 and 3, a radially-overlapping hub interface (e.g., an annular lap joint) may be provided between forward hub section 56 and aft hub section 60 for radial piloting purposes. Furthermore, as shown in FIG. 3, a central opening 65 provided through forward hub section 56 aligns with a central opening 67 provided through aft hub section 60 to define a longitudinal channel 65, 67 through radial turbine 20. A spool (e.g., high pressure shaft 24 of GTE 18) extends through this longitudinal channel when radial turbine 20 is installed within GTE 18 (FIG. 1). Radial turbine 20 may be fixedly mounted to the gas turbine engine shaft utilizing, for example, a curvic-type attachment. Forward blade segments 58 align axially with and preferably abut or interlock with aft blade segments 62. Axial alignment of forward blade segments 58 and aft blade segments 62 may be maintained by an axial clamping force or pre-load exerted on radial turbine 20 by a tie-shaft (not shown). Additionally, the mating interface between forward hub section 56 and aft hub section 60 may be fabricated to include one or more alignment features (e.g., keys, teeth, or castellations). As a result of this structural configuration, neighboring pairs of forward blade segments 58 and aft blade segments 62 cooperate to form continuous blade structures 58, 62, which, along with outer hub flow surfaces 69 (FIG. 3), provide substantially uninterrupted airflow guidance surfaces when transitioning from forward hub section 56 and aft hub section 60 of radial turbine 20.

By virtue of its multi-piece construction, axially-split radial turbine 20 can be readily fabricated to include at least one inner disk cavity for mass reduction and/or for internal cooling purposes. For example, as shown in FIG. 3, axially-split radial turbine 20 may be fabricated to include an inner disk cavity 68, 70 formed within the body of turbine 20 between forward hub section 56 and aft hub section 60. In the illustrated example, inner disk cavity 68, 70 assumes the form of an annular void extending around the rotational axis of radial turbine 20; however, in further embodiments, inner disk cavity 68, 70 may comprise a plurality of discrete cavities or pockets, which are formed within the body of turbine 20 as an angularly- or circumferentially-spaced array. Inner disk cavity 68, 70 is conveniently formed in trailing face of forward hub section 56, the leading face of aft hub section 60, or a combination of the two by removal of material during the below-described fabrication process. For example, a first annular channel or groove 68 may be formed in the trailing face of forward hub section 56 and a second annular channel or groove 70 may be formed in the leading face of aft hub section 60 by machining, which then align to form inner disk cavity 68, 70 when radial turbine 20 is assembled.

In addition to providing the above-noted benefits in mass reduction, inner disk cavity 68, 70 is also advantageously utilized to enhance the internal cooling performance of radial turbine 20. To this end, axially-split radial turbine 20 can be fabricated to further include a plurality of hub cooling passages 72 (one of which is shown in FIG. 3), which place inner disk cavity 68, 70 in fluid communication with a cooling air source. As indicated in FIG. 3, hub cooling passages 72 are conveniently formed as radially-extending conduits, which are circumferentially spaced about the rotational axis of turbine 20 and which extend along the interface between forward hub section 56 and aft hub section 60. Each hub cooling passage 72 includes an inlet 76, which is formed in the inner circumferential surface of turbine hub 56, 60 in radial alignment with split line 54; and an outlet 74, which is fluidly coupled to inner disk cavity 68, 70. Inner disk cavity 68, 70 is, in turn, fluidly coupled to the inlet or inlets of one or more cooling flow passages formed within forward blade segments 58 and/or aft blade segments 62. For example, as shown in FIG. 3, inner disk cavity 68, 70 may be fluidly coupled to an inlet 75 of a first flow passage 64 formed within each forward blade segment 58 and to an inlet 77 of a second flow passage 66 formed within each aft blade segment 62. In this manner, cooling airflow received along inner channel 65, 67 can be directed into inner disk cavity 68, 70 by hub flow passages 72 and, from cavity 68, 70, distributed to blade cooling passages 64, 66.

Describing an exemplary radial turbine cooling flow scheme, and returning briefly to FIG. 1, relatively cool airflow may be bled from a section of the engine upstream of combustion section 30 and supplied to radial turbine 20 during engine operation; e.g., as indicated in FIG. 1 by arrows 80, a portion of the airflow flowing within compressor section duct 32 may be diverted into outlet 82 of a combustion bypass conduit 84. A portion of this relatively cool bypass airflow may be directed toward the leading edge of forward hub section 56 to provide saddle cooling (indicated in FIG. 1 by arrow 86), while the remainder of the bypass air may be directed radially inward toward the engine centerline. The bypass airflow may then be conducted axially along HP shaft 24 and ultimately flow into inlets 76 of hub cooling passages 72. As indicated in FIG. 1 by arrows 88, hub cooling passages 72 direct the relatively cool bypass airflow radially outward through the body of turbine 20 and into inner disk cavity 68, 70, which then distributes the cooling airflow to internal cooling features 64, 66 provided in the turbine blade segments (FIG. 3). Various different devices and techniques can also be utilized to encourage cooling airflow through the above-described cooling circuit. For example, radial turbine 20 can be equipped with one or more spoiler tubes. Additionally or alternatively, GTE 18 may be equipped with a "Tangential On-Board Injection" or "TOBI" device 90 (FIG. 1), which injects the cooling airflow immediately upstream of the high pressure turbine while imparting the airflow with a tangential or swirling-type motion to reduce parasitic pumping losses.

As previously stated, forward turbine rotor 50 is advantageously produced from two distinct components or sections, which are metallurgically bonded together during fabrication to yield a monolithic or unitary piece. In the exemplary embodiment illustrated in FIGS. 2 and 3, and referring specifically to FIG. 3, the two distinct components or sections bonded together to produce forward turbine rotor 50 are a forward bladed ring 94 and a forward disk 96. Forward bladed ring 94 includes or embodies a majority of each forward blade segment 58 and, in certain cases, may include the entirety of each forward bladed segment 58. By comparison, forward disk 96 includes or embodies the entirety or substantial entirety of forward hub section 56. The demarcation between forward bladed ring 94 and forward disk 96 is visually indicated in FIG. 3 by dashed bond line 92. As can be seen, dashed bond line 92 has a generally conical geometry, which decreases in outer diameter when moving in a fore-aft direction. By comparing bond line 92 to the illustrated outer hub flow surface 69, it can further be seen that a leading portion of the hub flow path is defined by forward disk 96, while an intermediate portion of the hub flow path is defined by forward bladed ring 94. Inner disk cavity 68, 70 is bounded, in part, by both forward bladed ring 94 and forward disk 96. As forward bladed ring 94 extends to and partially defines inner disk cavity 68, 70, blade cooling passages 64 can be formed entirely within forward bladed ring 94, which can be readily fabricated from a number of small-volume cast pieces to facilitate the formation of blade cooling passages 64, as described more fully below.

As is forward turbine rotor 50, aft turbine rotor 52 can be fabricated from two distinct components or sections, which are metallurgically bonded together during fabrication to yield a monolithic or unitary piece. Referring to FIG. 3, an aft bladed ring 100 and an aft disk 102 are bonded together to yield aft turbine rotor 52. Aft bladed ring 94 includes or embodies a majority of each aft blade segment 62 and, in the illustrated example, includes the entirety of each aft blade segment 62 and a relatively thin annular region of aft hub section 60 underlying blade segments 62, as taken in an inward radial direction. As a corollary, aft bladed ring 94 defines the aft sections of hub flow paths 69. The demarcation between aft bladed ring 100 and aft disk 102, which includes or embodies the entirety or substantial entirety of aft hub section 60, is visually indicated in FIG. 3 by dashed bond line 98. In addition to being bound by forward bladed ring 94 and forward disk 96, inner disk cavity 68, 70 is further bound by aft bladed ring 100 and aft disk 102. In this manner, blade cooling passages 66 can be formed entirely within aft bladed ring 100, which can be readily fabricated from a number of small-volume cast pieces to facilitate the formation of passages 66. The foregoing notwithstanding, aft turbine rotor 52 can be fabricated from a single piece (e.g., a unitary forging or single-shot casting) in alternative embodiments and thus may not include bond line 98.

Figure 4:
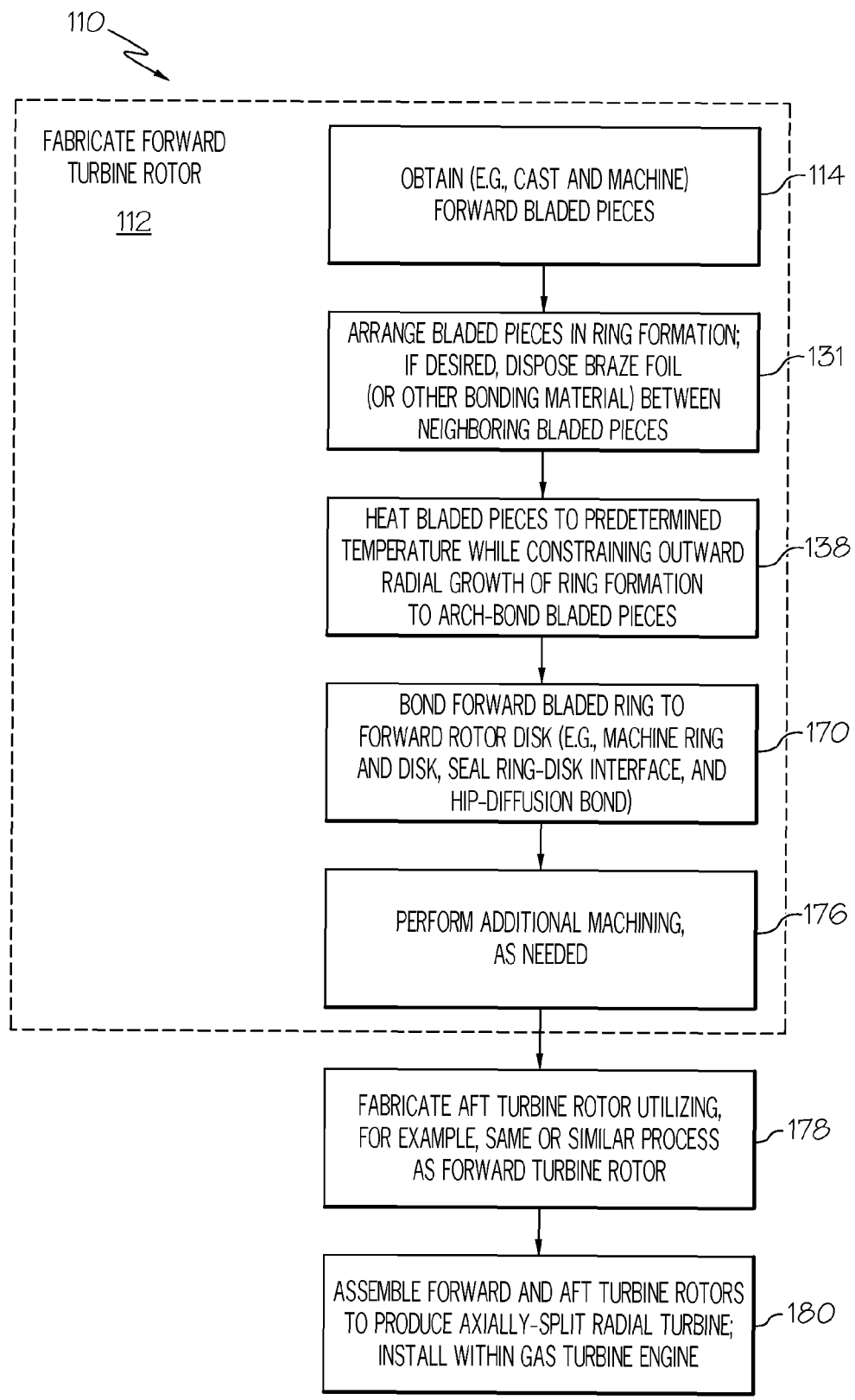
FIG. 4 is a flowchart illustrating an exemplary method for manufacturing an axially-split radial turbine, such as the internally-cooled, axially-split radial turbine shown in FIGS. 1-3.

FIG. 4 is a flowchart illustrating a method 110 for manufacturing an axially-split radial turbine in accordance with an exemplary embodiment of the present invention. For ease of explanation, the following will describe exemplary method 110 in conjunction with the fabrication of internally-cooled, axially-split radial turbine 20 shown in FIGS. 1-3; however, method 110 can be utilized to produce various other types of radial turbines having structural features that differ from those described above-in conjunction with radial turbine 20. Several of the steps described in conjunction with method 110 below are similar to steps in the fabrication processes described in co-pending U.S. patent application Ser. No. 13/371,922, filed with the USPTO on Feb. 13, 2012, and assigned to the assignee of the instant application.

Forward turbine rotor 50 and aft turbine rotor 52 can be produced in parallel or in series, with either rotor produced first. In exemplary method 110, forward turbine rotor 50 is initially produced by way of a first sub-process (SUB-PROCESS BLOCK 112, FIG. 4). To commence the production of forward turbine rotor 50, a plurality of bladed pieces is produced or otherwise obtained (STEP 114, FIG. 4). The bladed pieces may be purchased from a supplier or independently fabricated by, for example, individual casting and machining. The bladed pieces are ideally fabricated from an oxidation-resistant material having good mechanical strength at high temperatures. In a preferred embodiment, each bladed piece is cast from a single crystal superalloy having its crystallographic grain structure oriented to provide optimal mechanical strength in a radial direction. By way of non-limiting example, an oxidation-resistant, single crystal, nickel-based superalloy may be utilized, such as the nickel-based superalloy commercially identified as "CMSX 4" or the nickel-based superalloy commercially identified as "SC180," although various other high temperature materials may also be utilized including equiaxed superalloys. Notably, by initially casting a number of small volume bladed pieces, casting yields can be favorably increased as compared to the casting of a bladed ring in its entirety. In addition, casting such small-volume bladed pieces allows the turbine blades to be imparted with relatively complex internal geometries and, therefore, relatively tortuous internal cooling flow passages, such as blade cooling passages 64 and 66 shown in FIG. 3.

Figure 5:
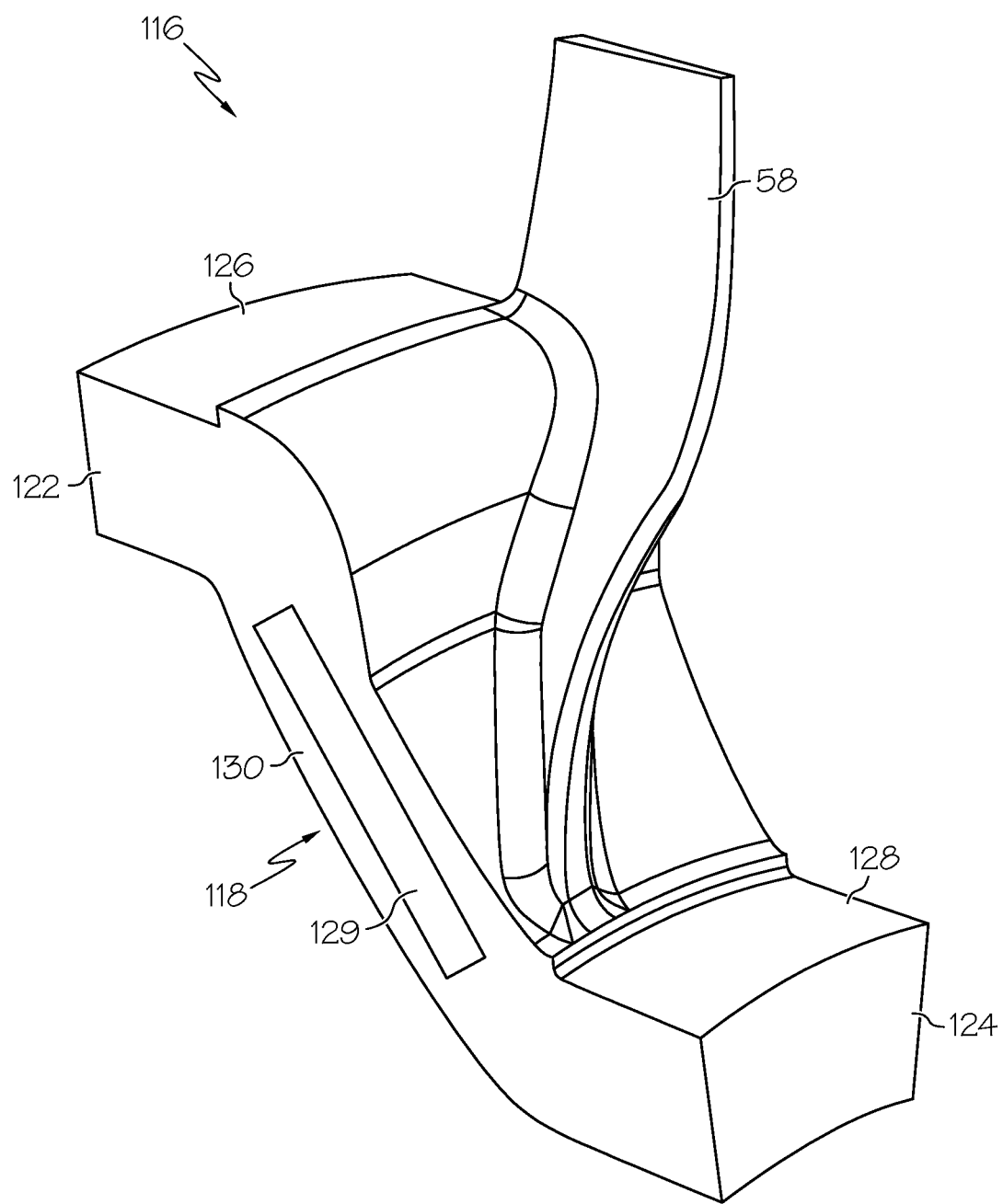
FIG. 5 is an isometric view of one of a plurality of forward bladed pieces that may be produced and subsequently inter-bonded with a plurality of like blade pieces to produce the forward bladed ring of the axially-split radial turbine, in accordance with the manufacturing method shown in FIG. 4.
Figure 6:
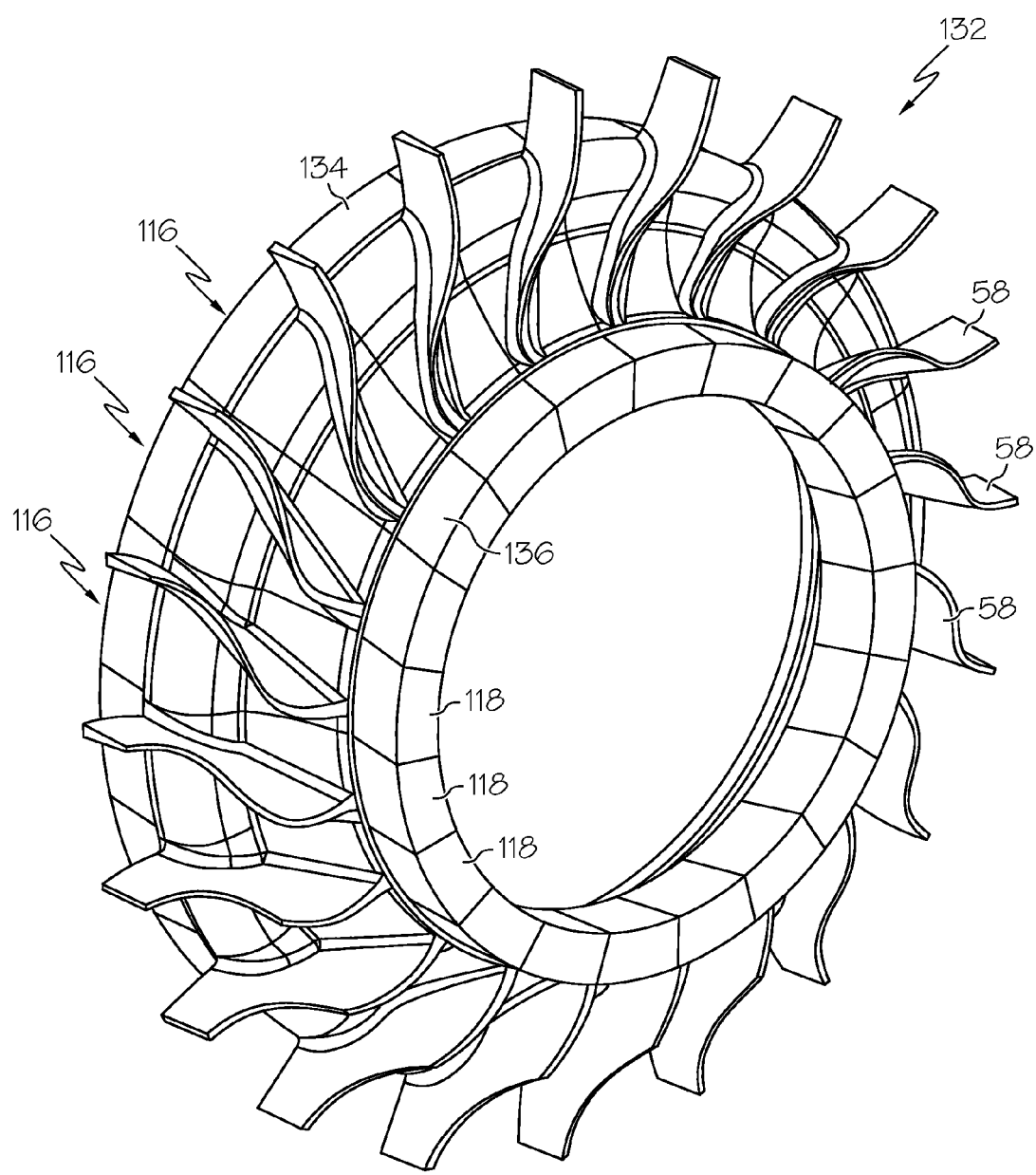
FIG. 6 is an isometric view of a bladed ring formation into which the exemplary bladed piece shown in FIG. 5 and like bladed pieces may be arranged prior to consolidation into a bonded bladed ring.

FIG. 5 is an isometric view of an exemplary bladed piece 116 that may be produced pursuant to STEP 114 of method 110 (FIG. 4). In this particular example, bladed piece 116 includes a wedge-shaped body or shank 118 from which a forward blade segment 58 extends. Shank 118 has been cast or otherwise fabricated to an outer sacrificial portion (e.g., extra axial stock) enveloping or encompassing the desired shape of the completed shank. Stated differently, shank 118 is a rough casting or preform physically embodying the finished shank, which may be subsequently defined by further machining. Shank 118 includes a sacrificial forward shoulder 122 and a sacrificial aft shoulder 124, which extend from the central body of shank 118 in opposing axial directions. Opposing axial shoulders 122 and 124 are fabricated to include outer tooling contact surfaces 126 and 128, respectively, which are located axially adjacent to forward and aft ends of forward blade segment 58 and which have a gently curved or arced outer geometry. Shank 118 also includes opposing lateral faces or sidewall surfaces 130, only one of which can be seen in FIG. 5. Sidewall surfaces 130 are each angled to impart shank 118 with a wedge-shaped geometry, when viewed from the forward/leading or aft/trailing end thereof. As each sidewall surface 130 of shank 118 will ultimately be bonded to a mating surface of a neighboring shank, sidewall surfaces 130 are also referred to herein as "shank-to-shank bonding surfaces 130." As described more fully below in conjunction with FIGS. 11-13, in certain embodiments, one or more strips of braze foil may be inserted between neighboring shanks 118 prior to the below-described bonding process. To accommodate the braze foil, each bladed piece 116 may be fabricated to include at least one braze foil pocket 129, which may be formed in one or both of sidewall surfaces 130.

A series of steps is next performed to inter-bond or consolidate bladed pieces 116 and produce the forward bladed ring. First, bladed pieces 116 are arranged in an annular group or ring formation (STEP 131, FIG. 4), such as ring formation 132 shown in FIG. 6. When bladed pieces 116 are arranged in this manner, each shank 118 is positioned between two neighboring shanks 118 (three of which are labeled in FIG. 6), and each shank-to-shank bonding surface 130 (identified in FIG. 5) is positioned adjacent a neighboring bonding surface 130. The neighboring bonding surfaces 128 may contact each other at this stage in the fabrication process or may instead be separated by a small radial gap. Outer tooling contact surfaces 126 and 128 of axially-extending shoulders 122 and 124 (FIG. 5) combine to impart ring formation 132 with forward and aft composite tooling contact surfaces 134 and 136, respectively. Composite tooling contacts surfaces 134 and 136 each have a substantially annular geometry and extend from circumferentially-spaced blade segments 58 of ring formation 132 in opposing axial directions. Due to the inwardly-tapered conical geometry of ring formation 132, forward composite tooling contact surface 134 has a greater outer diameter than does aft composite tooling contact surface 136.

In certain implementations of method 110, bonding material may be disposed between neighboring shank-to-shank bonding surfaces 130 (FIG. 5) during STEP 131 of exemplary method 110 (FIG. 4). In embodiments wherein braze foil pockets are formed in shank-to-shank bonding surfaces 130, such as pocket 129 formed in sidewall 130 (FIG. 5), a strip of braze foil may be inserted into each pocket. In this case, it is preferred that the volume of each braze foil sheet is slightly greater than the volume of its corresponding pocket to ensure the creation of a void-free, zero-defect braze joint during the below-described directed thermal growth bonding process. In this regard, the braze foil sheet may be trimmed to have planform dimensions (e.g., a height and width) substantially equivalent to the dimensions of braze foil pockets, while the thickness of the braze foil sheet may be chosen to be slightly greater than the pocket depth; e.g., in one implementation wherein the pocket depth is about 0.0025 inch, the braze foil thickness may be about 0.0030 inch. Additionally or alternatively, braze paste may be dispensed into pockets 129 (FIG. 5) or otherwise applied between the shank-to-shank bonding surfaces 130 (FIG. 5) to ensure a sufficient quantity of braze material is present to reliable create a void-free, zero-defect braze joint.

Next, at STEP 138 (FIG. 4), ring formation 132 is subjected to a directed thermal growth bonding process to inter-bond or arch-bond bladed pieces 116 and thereby yield a monolithic bladed ring. During the directed thermal growth bonding process, ring formation 142 is heated a predetermined bonding temperature or temperatures while the outward radial growth of ring formation is constrained 142 to urge convergent growth of the shank-to-shank bonding surfaces 130 (FIG. 5) and thereby promote shank-to-shank bonding. A specialized thermal growth constraint tool is utilized to constrain or physically impede the outward radial growth of ring formation 132 during the directed thermal growth process, while avoiding bending, distortion, or warping of turbine blade segments 58. The thermal growth constraint tool thus enables the inter-bonding or arch-bonding of the forward bladed pieces to form a bonded bladed ring, which can then be bonded onto a forward rotor disk to produce a forward turbine rotor, such as forward turbine rotor 50 shown in FIGS. 1-3. An example of a thermal growth constraint tool suitable for this purposes is described below in conjunction with FIGS. 7-9.

Figure 7:
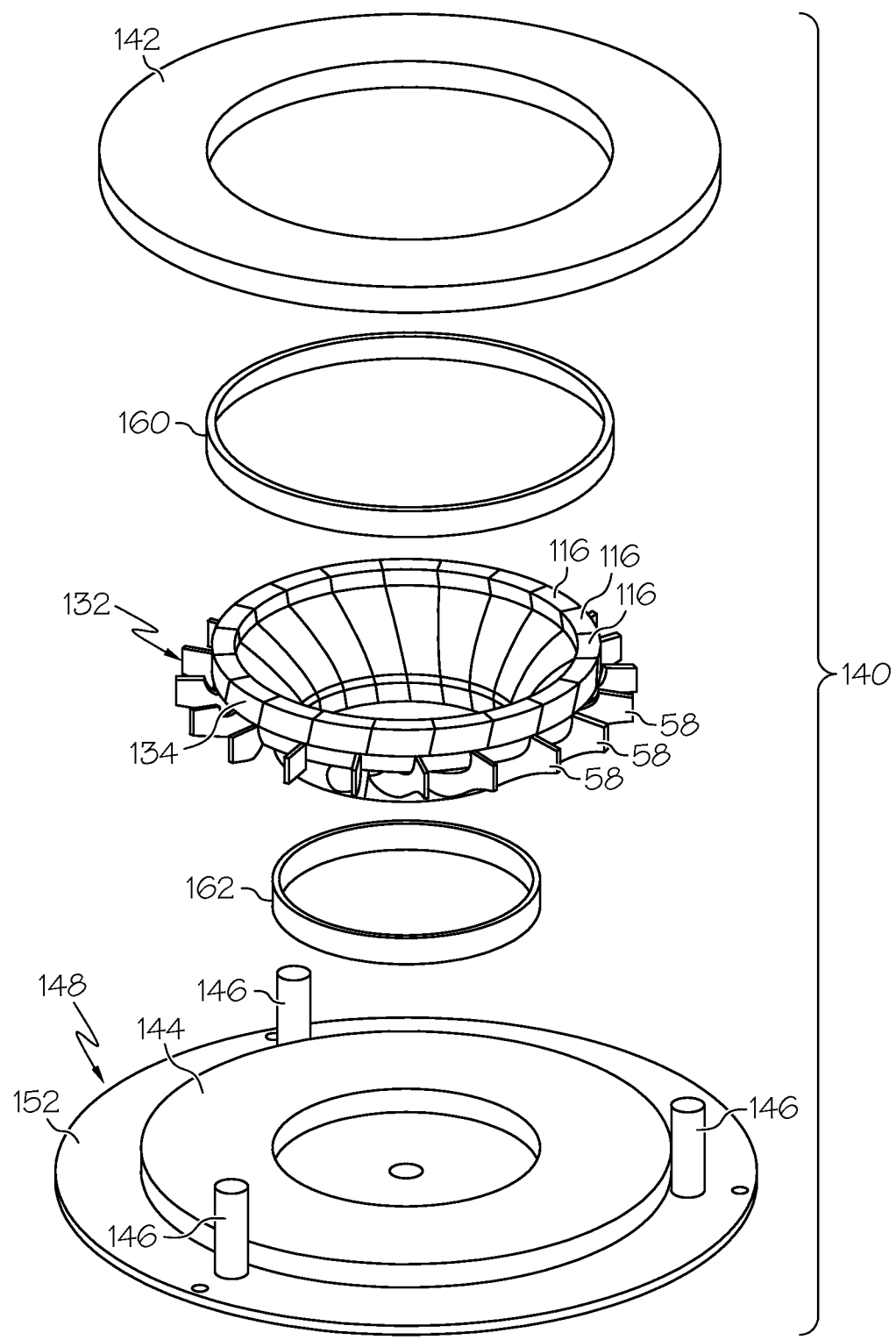
FIGS. 7 and 8 are exploded and assembled views, respectively, of a thermal growth constraint tool suitable for carrying-out a directed thermal growth bonding process to consolidate the bladed ring formation shown in FIG. 6 and produce a monolithic bladed ring.
Figure 8:
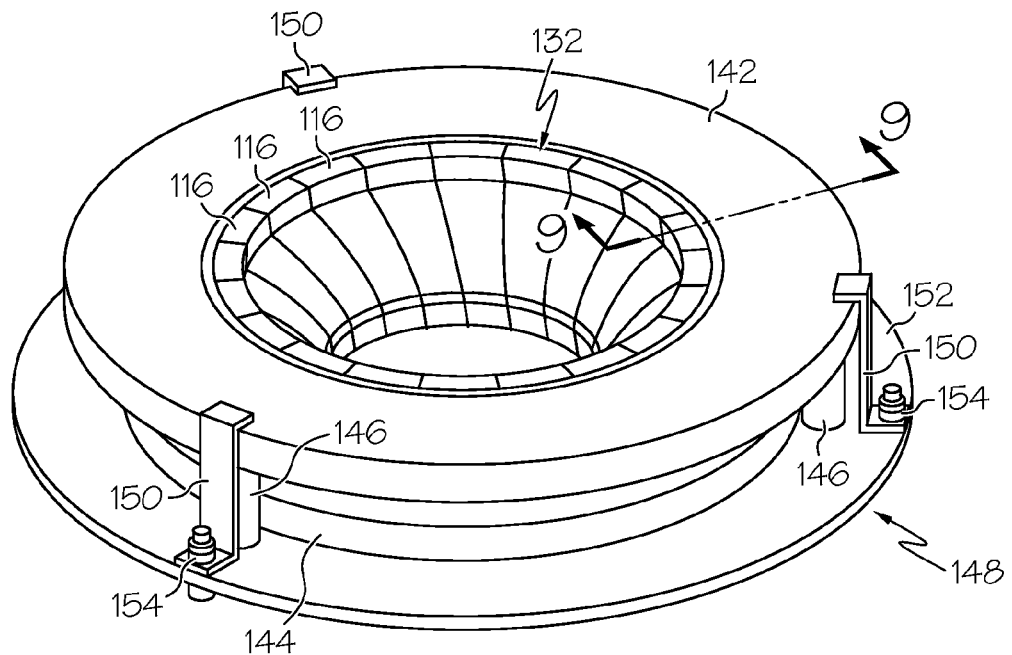

FIGS. 7 and 8 are exploded and assembled views, respectively, of a thermal growth constraint tool 140 suitable for usage in the metallurgical consolidation of ring formation 132. Thermal growth constraint tool 140 and ring formation 132 are also partially shown in FIG. 9, which is a cross-sectional view taken along line 9-9 identified in FIG. 8. In the exemplary embodiment shown in FIGS. 7-9. thermal growth constraint tool 140 includes four main components: (i) first thermal growth constraint ring 142, (ii) a second thermal growth constraint ring 144, (iii) a plurality of spacer members 146, and (iv) a baseplate 148. Thermal growth constraint rings 142 and 144, spacer members 146, and baseplate 148 are sized and shaped to be assembled around ring formation 132 in a stacked formation. That is, when thermal growth constraint tool 140 is fully assembled, thermal growth constraint ring 144 is positioned over and supported by baseplate 148, spacer members 146 are positioned over and extend upward from constraint ring 144, and constraint ring 142 is positioned over and supported by spacer members 146. To retain constraint rings 142 and 144 and spacer members 146 in their desired positions after tooling assembly, a plurality of retainers 150 (e.g., L-shaped brackets) are affixed to an outer peripheral flange 152 provided around baseplate 148 utilizing a plurality of bolts 154 or other such fasteners (shown in FIGS. 8 and 9).

Thermal growth constraint rings 142 and 144 are shaped and sized to extend around different circumferential portions of ring formation 132 when loaded into thermal growth constraint tool 140. In particular, thermal growth constraint rings 142 and 144 are sized and shaped to be disposed around composite tooling contact surfaces 134 and 136, respectively; e.g., the inner diameters of the central openings provided in rings 142 and 144 are fabricated to be slightly larger than the outer diameters of contact surface 134 and 136, respectively. As the outer diameter of composite tooling contact surface 134 is greater than the outer diameter of composite tooling contact surface 136, the inner diameter of central opening provided in thermal growth constraint ring 142 is likewise chosen to be greater than the inner diameter of the central opening provided in thermal growth constraint ring 144.

Figure 9:
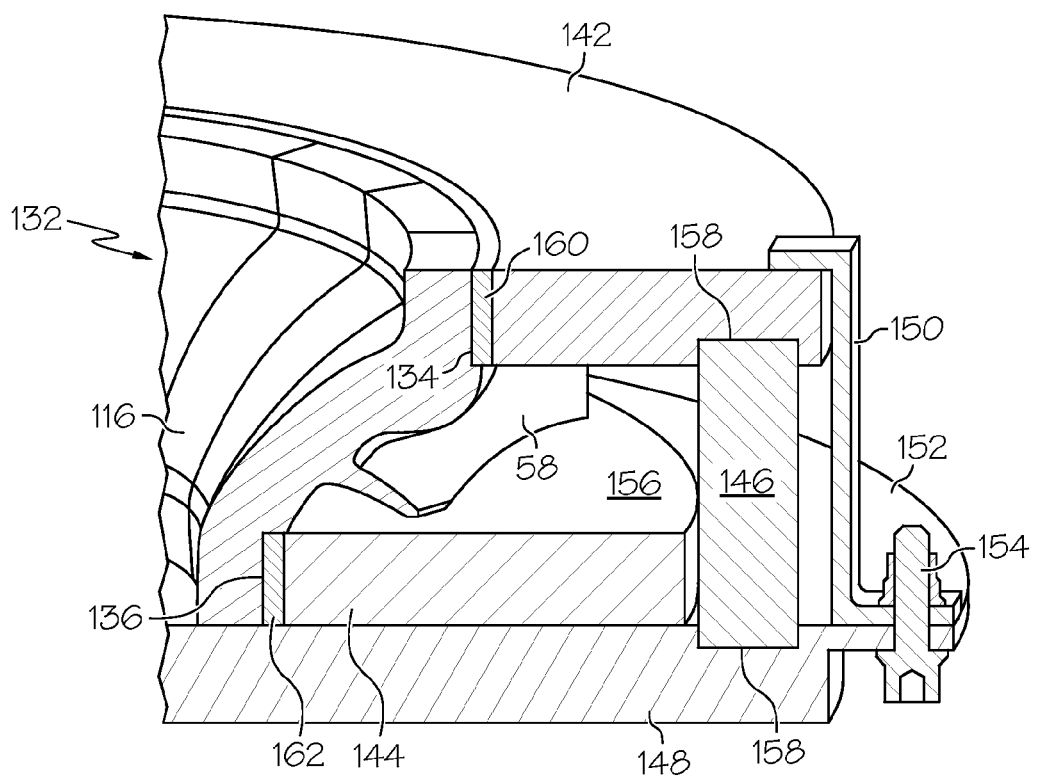
FIG. 9 is a cross-sectional view of the thermal growth constraint tool and ring formation taken along line 9-9 identified in FIG. 8.
Figure 10:
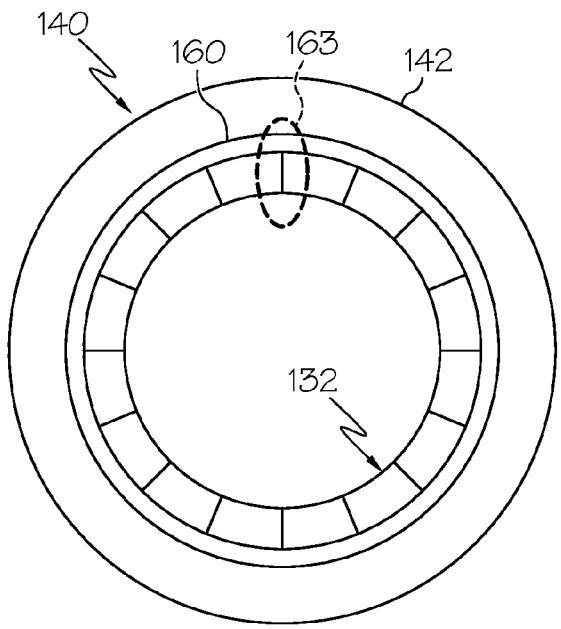
FIG. 10 schematically illustrates the thermal growth constraint tool and ring formation shown in FIGS. 7-9 prior to metallurgical consolidation into a monolithic or single-piece ring.

When thermal growth constraint tool 140 is assembled, thermal growth constraint rings 142 and 144 are axially spaced or offset by spacer members 146 such that a relatively large axial gap or annular void 156 (identified in FIG. 9) is provided between the inner faces of constraint rings 142 and 144. As shown in FIGS. 8 and 9, forward blade segments 58 extend radially into an annular void 156 (FIG. 9) when ring formation 132 is positioned within thermal growth constraint tool 140 such that turbine blade segments 58 generally reside between inner radial faces of constraint rings 142 and 144. Spacer members 146 may assume any form suitable for maintaining the axial spacing of thermal growth constraint rings 142 and 144 during thermal processing. In the illustrated example, spacer members 146 comprise three stand-off pins, which are circumferentially spaced around the central axis of thermal growth constraint tool 140 and which extend from constraint ring 142 to baseplate 148. As shown in FIG. 9, the opposing ends of each stand-off pin may be received within axially-aligning cylindrical recesses 158 provided in the inner radial faces of constraint ring 142 and baseplate 148.

Thermal growth constraint rings 142 and 144 are fabricated to grow in a radially outward direction at a rate significantly slower than does ring formation 132 during thermal processing. To ensure a substantially uniform application of force to the forward and aft ends of ring formation 132, constraint rings 142 and 144 are also preferably fabricated to grow radially outward at substantially equivalent rates. To this end, constraint rings 142 and 144 may each be fabricated from a refractory material having a coefficient of thermal expansion ("CTE") less than that of ring formation 132 and, preferably, less than approximately one half the CTE of the material from which the individual bladed pieces are formed. It is also desirable for constraint rings 142 and 144 to have a sufficient high temperature strength to constrain the outward radial growth of ring formation 132, as described more fully below. Considering this, it is preferred that thermal growth constraint rings 142 and 144 are formed from a metallic material (i.e., a non-ceramic metal or superalloy) having a relatively low CTE, such as molybdenum or rhenium. In one embodiment, thermal growth constraint rings 142 and 144 each comprise an annular body fabricated from molybdenum.

Spacer members 146 are preferably fabricated from a material having CTE substantially equivalent to (e.g., differing by no more than about 20% relative to) the CTE of the bladed pieces from which ring formation 132 is formed. When formed from a material having a CTE similar to the CTE of bladed pieces, spacer members 146 grow in axial direction at a rate substantially equivalent to ring formation 132 to maintain proper radial alignment between thermal growth constraint rings 142 and 144 and tooling contact surfaces 134 and 136, respectively. This also helps to maintaining proper axial spacing between constraint rings 142 and 144 and to prevent undesired contact between the turbine blades and the inner radial faces of constraint rings 142 and 144. In one embodiment, spacer members 146 are each fabricated from the same or similar material (e.g., a nickel-based superalloy) as are the bladed pieces that make-up formation 132. The CTE of spacer members 146 will also typically be greater than the CTE of constraint ringers 142 and 144.

As shown in FIGS. 7 and 9, a first sacrificial crush ring 160 may be disposed around a first circumference of ring formation 132 and between tooling contact surface 126 (identified in FIG. 9) and thermal growth constraint ring 142; and a second sacrificial crush ring 162 may be disposed around a second circumference of ring formation 132 and between tooling contact surface 128 (identified in FIG. 9) and thermal growth constraint ring 162. Crush rings 160 and 162 are fabricated from a material that softens and plastically deforms during thermal processing. In this manner, the material from which crush rings 160 and 162 are formed can flow or deform to accommodate misalignment between the bladed pieces and geometric imperfections in tooling contact surfaces 126 and 128 and thereby ensure that a substantially uniform load is applied to ring formation 132 during thermal bonding. In addition to softening at thermal processing temperatures, the material from which crush rings 160 and 162 are formed also preferably has a CTE similar to the material from which the bladed pieces are fabricated to allow crush rings 160 and 162 to grow radially outward in conjunction with ring formation 132. Finally, it is also desirable for the crush ring material to be relatively low cost in view of the consumable or sacrificial nature of crush rings 160 and 162. In one implementation, crush rings 144 are each fabricated from a low carbon or other low superalloy steel, such as an AISI 1010 or 1020 steel.

Figure 11:
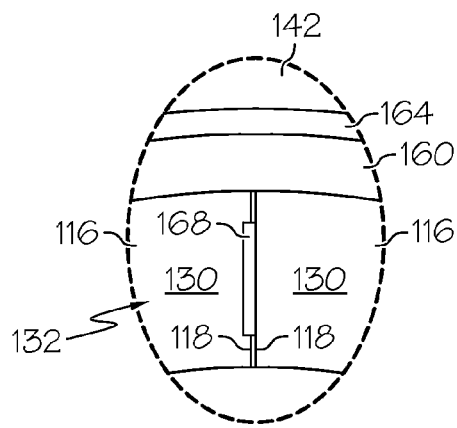
FIGS. 11-13 are detailed views of a portion of the thermal growth constraint tool and ring formation shown in FIG. 10 illustrating one manner in which the outward radial growth of the bladed ring formation may be impeded by the constraint tool during a directed thermal growth bonding process to promote shank-to-shank bonding of the forward bladed pieces.
Figure 12:
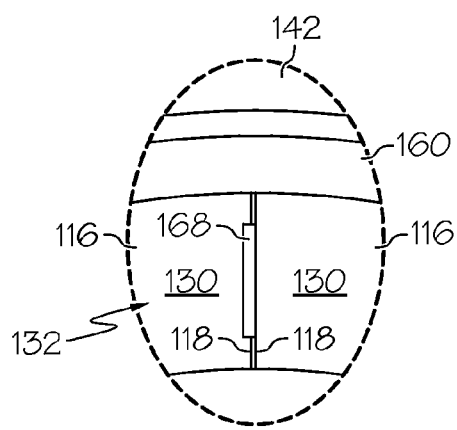
Figure 13:
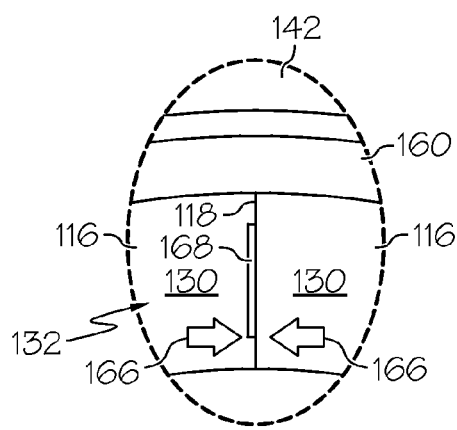

FIGS. 10-13 generically illustrate the manner in which thermal growth constraint tool 140, and specifically thermal growth constraint rings 142 and 144, impede the outward radial growth of ring formation 132 during the directed thermal growth bonding process. While only thermal growth constraint ring 142 is shown in FIGS. 10-13 and described below, it will be appreciated that the following description applies equally to thermal growth constraint ring 144. With reference to FIG. 11, which is a detailed view of the region of ring formation 132 encompassed by dashed circle 163 (FIG. 10), the outer circumferential surface of crush ring 160 may be separated from the inner circumferential surface of constraint ring 142 by a small radial gap 164 prior to heating. As ring formation 132 and thermal growth constraint tool 140 are heated to the desired bonding temperature, ring formation 132 grows in a radially outward direction such that the outer circumference of formation 132 gradually increases. In embodiments wherein crush ring 160 is formed from a material having a CTE similar or identical to that of ring formation 132, crush ring 160 likewise grows radially outward in conjunction with ring formation 132. Constraint ring 142 grows radially outward more gradually than does ring formation 132 and crush ring 160; consequently, radial gap 164 eventually closes and crush ring 160 comes into to contact with constraint ring 142 (shown in FIG. 13). At this point, further outward radial growth of ring formation 132 and crush ring 160 is impeded or physically obstructed by constraint ring 142. Further growth of ring formation 132 consequently results in the application of a significant convergent pressure urging shanks 118 together, as represented in FIG. 13 by arrows 166. A strong metallurgical bond is formed between neighboring shanks 118 as a result of this combination of high temperatures and high convergent pressures. The bond between neighboring shanks 118 may be created by melting (and the subsequent re-solidification) of a braze material disposed between shanks 118, if provided, by diffusion bonding, or by a combination thereof.

With continued reference to FIGS. 11-13, in embodiments wherein the shanks of neighboring bladed pieces 116 are to be joined by brazing, a strip or strip of braze foil 168 may be disposed between neighboring shank bonding surfaces. In this event, the bonding temperature or temperatures to which ring formation 132 and thermal growth constraint tool 140 are heated during STEP 138 (FIG. 4) will typically be selected to exceed the melt point of braze superalloy material, while being less than the melt point of the other components included within tooling 118 and ring formation 132. Conversely, in embodiments wherein a braze foil or other bonding material is not disposed between neighboring shanks, the bonding temperatures and components dimensions are selected to create sufficient convergent pressures to ensure the creation of a diffusion bond between neighboring shanks. In many cases, both a braze joint and a diffusion bond may be created between neighboring shanks during the above-described directed thermal growth bonding process. By way of non-limiting example, ring formation 132 and thermal growth constraint tool 140 may be heated to temperature approaching or exceeding about 2150° Fahrenheit during the above-described bonding process.

Figure 14:
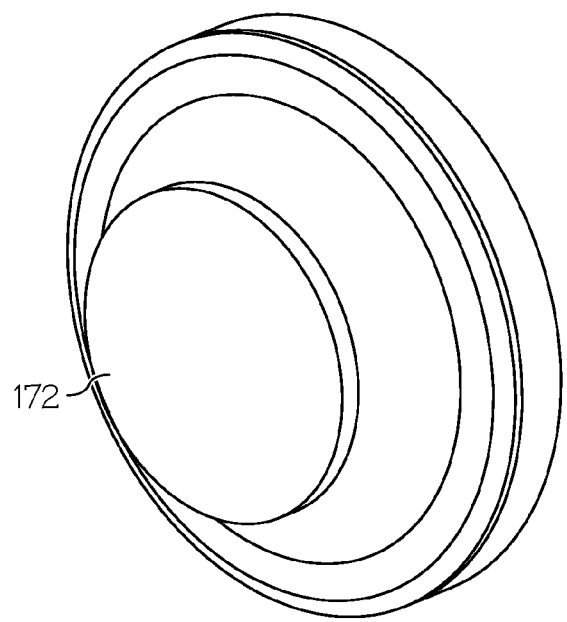
FIGS. 14 and 15 are isometric views of a partially-machined disk forging (in this example, the forward disk) prior to and after joinder to the machined bonded bladed ring (in this example, the forwarded bladed ring) to yield the forward turbine rotor.

Through the above-described directed thermal growth process, bladed pieces 116 are metallurgically consolidated into a monolithic bladed ring, which, in this case, serves as forward bladed ring 94 (FIG. 3) of axially-split radial turbine 20. Next, at STEP 170 of exemplary fabrication method 110 (FIG. 4), forward bladed ring 94 is bonded onto a forward rotor disk to produce forward turbine rotor 50 (FIGS. 1-3). An example of a forward rotor disk 172 onto which forwarded bladed ring 94 may be bonded is shown in FIG. 14. Forward rotor disk 172 may be produced by, for example, forging a cylindrical preform from a selected superalloy or other material and subsequent machining the forging to a near-net shape. Forward rotor disk 172 is preferably fabricated from an superalloy tailored to the unique operational environment of the rotor disk; e.g., an superalloy having relatively high stress rupture and life cycle fatigue properties. In one implementation, forward rotor disk 172 is fabricated from an oxidation-resistant, nickel-based superalloy; while the forward bladed ring is fabricated from a single crystal superalloy of the type described above.

Figure 15:
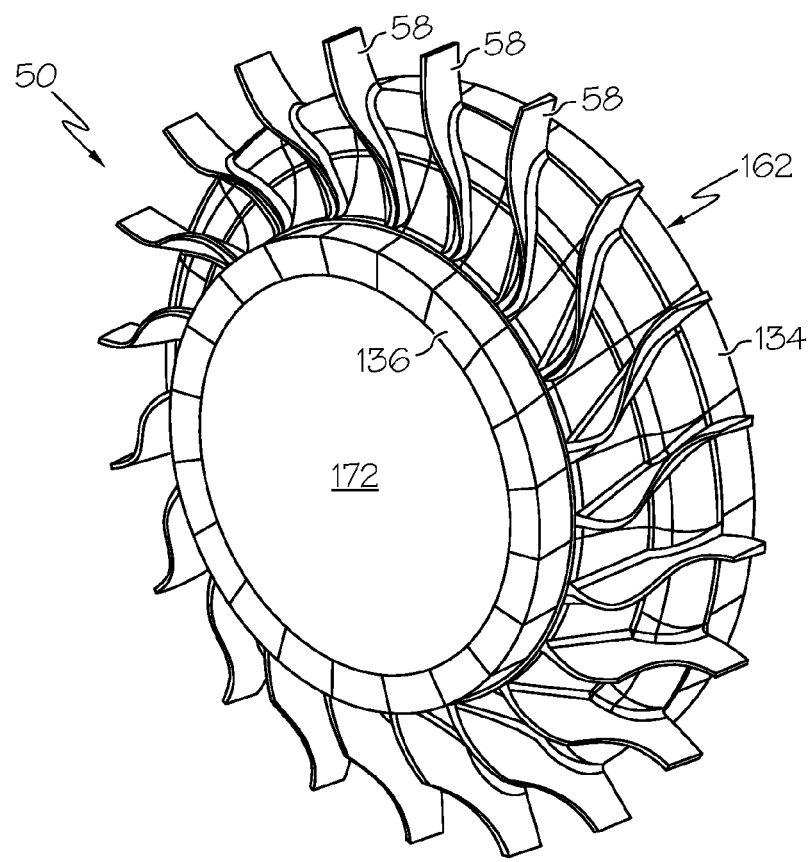

After production of the rotor disk forging, the outer annular portion of forward rotor disk 172 may be machined to impart disk 172 with a desired surface finish and an outer diameter approximately equivalent to the inner diameter of the machined airfoil ring. The leading and trailing annular interfaces between the outer circumference of the ring and the inner circumference of disk 172 are sealed by, for example, brazing to prevent the ingress of air into the ring-disk interface that may otherwise interfere with optimal bonding. A hot isostatic pressing (HIP) diffusion process or other bonding process can then carried-out to bond forward bladed ring to forward rotor disk 172 and thereby yield a partially-completed version of forward turbine rotor 50, as shown in FIG. 15. Additional machining steps may be performed to complete fabrication of the forward turbine rotor; e.g., the formation of inter-blade cut-outs or other strain relief features and the removal of the braze material, if utilized to inter-bond the bladed pieces (STEP 176, FIG. 4). After production, forward turbine rotor 50 may be inspected for structural defects utilizing any one of a number of known non-destructive inspection techniques.

Next, at STEP 178 (FIG. 4), aft turbine rotor 52 (FIGS. 2 and 3) is produced. Aft turbine rotor 52 can be produced utilizing essentially the same steps employed in the fabrication of forward turbine rotor 50. For example, and referring once again to FIGS. 2 and 3, a number of aft bladed pieces, which include aft blade segments 62, may be individually cast from a chosen superalloy (e.g., a single crystal superalloy of the type described above) and subsequently consolidated into an aft bladed ring 100, which is then bonded onto a separately-produced aft rotor disk 102. In this case, aft bladed ring 100 may be fabricated from the same material (e.g., a single crystal superalloy) as is forward bladed ring 94 or, instead, fabricated from a different material. Aft rotor disk 102 may likewise be fabricated from the same material as is forward rotor disk 96 utilizing, for example, an isothermal forging process. Finally, as indicated in FIG. 4 at STEP 180, the forward and aft turbine rotors are assembled to produce axially-split radial turbine 20 (FIGS. 1-3), which can then be installed within a gas turbine engine; e.g., as described above, a curvic, tie-shaft, or other coupling may be utilized to axially-clamp forward turbine rotor 50 to aft turbine rotor 52 and thereby yield the assembled axially-split radial turbine 20.

It should thus be appreciated that, by way of the above-described fabrication process, forward bladed ring 94 (and therefore the entirety or at least a substantial portion of each forward blade segment 58 shown in FIGS. 1-3) can be fabricated from a first material (e.g., a single crystal superalloy) highly resistant to oxidation and other forms of chemical degradation, while forward disk 96 is fabricated from a second material (e.g., an equiaxed superalloy) having high stress rupture and low cycle fatigue properties. Similarly, aft bladed ring 100 (and therefore aft blade segments 62) can be fabricated from a third superalloy (e.g., a single crystal superalloy), while forward disk 96 is fabricated from a fourth material specifically tailored to its operating conditions. In a preferred embodiment, forward bladed ring 94 and aft bladed ring 100 are each fabricated from the same or similar single crystal alloys; while forward disk 96 and aft disk 102 are fabricated from the same or similar non-single crystal alloys. In still further embodiments, aft turbine rotor 52 may consist of a single material and may be fabricated as a unitary casting or forging.

The foregoing has thus provided embodiments of an axially-split radial turbine suitable for usage in a gas turbine engine that is relatively lightweight and cost effective to implement. In the above-described embodiments, the axially-split radial turbine included internal cooling features (e.g., blade cooling passages) favorably increasing the thermal capabilities of the radial turbine. The foregoing has also provided embodiments of a method for fabricating such a radial turbine enabling different turbine sections to be fabricated from disparate alloys tailored to the particular operating conditions experienced by each turbine section. Notably, embodiments of the above-described method for producing a radial wheel utilize multiple separately-cast pieces facilitate individual casting of blades having integral cooling passages. In so doing, axially-split radial turbines produced in accordance with the above described fabrication methods improve high casting yield and enable the separate pieces to be produced from superalloy compositions tailored to the varying thermal-mechanical requirements of a wide variety of applications.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It is being understood that various changes may be made in the function and arrangement of elements described in an exemplary embodiment without departing from the scope of the invention as set-forth in the appended claims.

What is claimed is:

1. An axially-split radial turbine, comprising:
a forward turbine rotor, comprising:
a forward bladed ring; and
a forward disk joined to the forward bladed ring; and
an aft turbine rotor;
a plurality of hub flow paths extending from the forward turbine rotor to the aft turbine rotor, the plurality of hub low paths each comprising:
a leading portion defined, at least in substantial part, by the forward disk; and
an intermediate portion defined, at least in substantial part, by the forward bladed ring;
wherein the forward turbine rotor and the aft turbine rotor are disposed in an axially-abutting, rotationally-fixed relationship.

2. The axially-split radial turbine of claim 1 wherein the forward bladed ring comprises a plurality of forward bladed pieces, and wherein the plurality of forward bladed pieces are cast to include a plurality of blade cooling passages.

3. The axially-split radial turbine of claim 2 wherein the aft turbine rotor comprises an aft disk; and
wherein the axially-split radial turbine rotor further comprises an inner disk cavity formed between the forward disk and the aft disk, the inner disk cavity in fluid communication with the plurality of blade cooling passages, the inner disk cavity at least partially bound by the forward bladed ring, the forward disk, and the aft turbine rotor.

4. The axially-split radial turbine of claim 3 further comprising at least one hub cooling passage extending from an inner circumferential surface of the axially-split radial turbine to the inner disk cavity.

5. The axially-split radial turbine of claim 1 wherein the forward bladed ring is produced from a plurality of forward bladed pieces, the plurality of forward bladed pieces individually cast and metallurgically consolidated utilizing a direct thermal growth process to produce the forward bladed ring.

6. The axially-split radial turbine of claim 5 wherein the plurality of forward bladed pieces are each cast from a single crystal superalloy, and wherein the forward disk is produced from a non-single crystal superalloy.

7. An axially-split radial turbine comprising:
a forward turbine rotor, comprising:
a forward disk; and
a forward bladed ring circumscribing and metallurgically bonded to the forward disk at a bond line that terminates adjacent axially opposed end portions of the forward turbine rotor, as taken along a rotational axis of the axially-split radial turbine; and
an aft turbine rotor disposed axially adjacent to and rotationally fixed relative to the forward turbine rotor;
wherein the forward bladed ring comprises a plurality of forward bladed pieces, and wherein each of the plurality of forward bladed pieces is individually cast to include at least one forward blade segment.

8. The axially-split radial turbine of claim 7 further comprising:
a plurality of blade cooling passages extending in the plurality of forward bladed pieces; and
an inner disk cavity formed within the axially-split radial turbine and in fluid communication with the plurality of blade cooling passages.

9. The axially-split radial turbine of claim 7 wherein the plurality of forward bladed pieces are individually cast from a single crystal alloy, and wherein the forward disk is composed of a non-single crystal alloy.

10. The axially-split radial turbine of claim 7 wherein the aft turbine rotor comprises:
an aft bladed ring produced from a plurality of aft bladed pieces each including at least one aft blade segment; and
an aft disk joined to the aft bladed ring.

11. The axially-split radial turbine of claim 10 further comprising:
a plurality of blade cooling passages extending in the plurality of aft bladed pieces; and
an inner disk cavity formed within the axially-split radial turbine and in fluid communication with the plurality of blade cooling passages.

12. The axially-split radial turbine of claim 7 wherein the bond line has a generally conical geometry, which decreases in outer diameter when moving in a fore-aft direction.

13. The axially-split radial turbine of claim 7 further comprising a hub flow path extending over the aft and forward turbine rotors, the hub flow path having a leading portion defined by the forward disk and having an intermediate portion defined by the forward bladed ring.

14. An axially-split radial turbine, comprising:
an aft turbine rotor, comprising:
an aft disk; and
an aft bladed ring circumscribing and metallurgically bonded to the aft disk at a bond line that terminates adjacent axially opposed end portions of the aft turbine rotor, as taken along a rotational axis of the axially-split radial turbine; and
a forward turbine rotor disposed axially adjacent to and rotationally fixed relative to the aft turbine rotor;
wherein the aft bladed ring comprises a plurality of aft bladed pieces, and wherein each of the plurality of aft bladed pieces is individually cast to include at least one aft blade segment.

15. The axially-split radial turbine of claim 14 wherein the plurality of aft bladed pieces are individually cast from a single crystal alloy, and wherein the aft disk is composed of a non-single crystal alloy.

16. The axially-split radial turbine of claim 14 wherein the forward turbine rotor comprises:
a forward bladed ring produced from a plurality of forward bladed pieces each including at least one forward blade segment; and
a forward disk joined to the forward bladed ring.

17. The axially-split radial turbine of claim 16 wherein the plurality of forward bladed pieces include a plurality of blade cooling passages.

18. The axially-split radial turbine of claim 17 further comprising an inner disk cavity formed between the forward disk and the aft disk, the inner disk cavity in fluid communication with the plurality of blade cooling passages.

* * * * *